United States Patent …

(12) United States Patent
McAlister (10) Patent No.: US 7,585,269 B2
(45) Date of Patent: Sep. 8, 2009

(54) CENTRIFUGAL CONCENTRATOR WITH VARIABLE DIAMETER LIP

(76) Inventor: Steven A. McAlister, 32778 Bellevue Crescent, Abbotsford, BC (CA) V2S 5K3

( * ) Notice: Subject to any disclaimer, the term of this patent is extended or adjusted under 35 U.S.C. 154(b) by 0 days.

(21) Appl. No.: 11/911,745

(22) PCT Filed: Apr. 13, 2006

(86) PCT No.: PCT/CA2006/000596

§ 371 (c)(1),
(2), (4) Date: Jun. 13, 2008

(87) PCT Pub. No.: WO2006/111008

PCT Pub. Date: Oct. 26, 2006

(65) Prior Publication Data

US 2008/0280746 A1     Nov. 13, 2008

Related U.S. Application Data

(60) Provisional application No. 60/672,024, filed on Apr. 18, 2005.

(51) Int. Cl.
*B04B 11/04* (2006.01)
(52) U.S. Cl. .............. 494/26; 494/37; 494/56; 494/80
(58) Field of Classification Search .......... 494/1, 494/5, 11, 23, 26–30, 36, 37, 63, 80, 56; 210/360.1, 380.1; 209/453, 485
See application file for complete search history.

(56) References Cited

U.S. PATENT DOCUMENTS

| | | | |
|---|---|---|---|
| 2,179,807 A * | 11/1939 | Asmussen | 494/27 |
| 4,286,748 A | 9/1981 | Bailey | |
| 4,743,227 A | 5/1988 | Takeuchi | |
| 4,824,431 A | 4/1989 | McAlister | |
| 4,983,156 A * | 1/1991 | Knelson | 494/28 |
| 5,462,513 A * | 10/1995 | McAlister | 494/56 |
| 5,713,826 A * | 2/1998 | West | 494/45 |
| 6,796,934 B1 * | 9/2004 | McAlister et al. | 494/56 |
| 7,500,943 B1 * | 3/2009 | Peacocke et al. | 494/29 |
| 7,503,888 B1 * | 3/2009 | Peacocke et al. | 494/29 |
| 2008/0280746 A1 * | 11/2008 | McAlister | 494/8 |

FOREIGN PATENT DOCUMENTS

| | | | |
|---|---|---|---|
| AU | 22055 | * | 4/1935 |
| JP | 58-24366 | * | 2/1983 |

OTHER PUBLICATIONS

PCT International Search Report and Written Opinion dated Jun. 22, 2006, PCT/CA2006/00596, International Filing Dated Apr. 13, 2006.

* cited by examiner

*Primary Examiner*—Charles E Cooley
(74) *Attorney, Agent, or Firm*—Oyen Wiggs Green & Mutala LLP (57) ABSTRACT

A centrifugal separator of the type having migration, retention and lip zones of the interior surface of the rotating bowl has a variable diameter lip to increase the amount of target material retained in the retention zone. The lip zone's variable diameter is provided by a flexible cylindrical member having an inner diameter which is selectively and uniformly decreased or increased by variation of the pressure applied to the member. By progressively decreasing the inner diameter of the lip zone the volume of retained material is increased over the cycle of the separator.

16 Claims, 7 Drawing Sheets

CENTRIFUGAL CONCENTRATOR WITH VARIABLE DIAMETER LIP

CROSS-REFERENCE TO RELATED APPLICATIONS

The present application claims priority from U.S. provisional patent application No. 60/672,024 filed Apr. 18, 2005, which is pending.

TECHNICAL FIELD

The present invention relates to centrifugal concentrators of the rotating bowl type for the separation of solids of higher density such as gold, iron or tin from a slurry containing solids of a lower density and liquid and more particularly to such centrifugal concentrators of the batch type.

BACKGROUND

The problem of separating particles of high density such as gold, iron or tin from tailings and other slurry streams has attracted a great many attempted solutions. The problem is that of separating small particles of higher density from a slurry containing water and particles of lower density. One approach has been to use the centrifugal force created in a rotating bowl to separate the high density particles from the lower density slurry. In the past this had been generally done by placing obstructions such as ribs in the path of the rotating slurry to trap the heavier particles. A problem with this method was that where the slurry contained fine, dense gangue particles, the grooves or depressions designed to retain the concentrate would rapidly pack with the gangue particles. The problem of packing has been partially solved by the present inventor's batch centrifugal concentrator which is the subject of U.S. Pat. No. 4,824,431. In that centrifugal concentrator, there are no obstacles to the flow of the slurry in the rotating drum. The slurry is delivered to the vicinity of the bottom of the rotating drum and travels up the smooth interior surface of the drum. The interior surface has three continuous zones: a migration zone, a retention zone above the migration zone, and an inwardly-inclined lip zone above the retention zone. The respective lengths and inclinations of the zones are selected to produce flow conditions in which less dense particles are expelled from the drum while denser particles migrate to and are retained in the retention zone.

The result is that an enriched layer of concentrate accumulates in the retention zone without the use of ridges or grooves which may become packed.

In operation of the present inventor's above-described centrifugal concentrator, which is a batch device, and uses a fixed lip to define the retention zone, on start-up, primarily gangue particles immediately accumulate against the wall of the retention zone. The target particles then gradually accumulate in a shallow layer inward of the first layer of relatively barren gangue particles at a depth where centrifugal force holds the denser target particles against the underlying layer, but the lighter gangue particle are swept away. If the concentration cycle is started with a very shallow lip, however, there is significantly less opportunity for non-target, or gangue material to deposit in the retention zone. In that case however, the retention zone has limited volume and quickly overflows so it is necessary to stop the machine to empty it at that point.

SUMMARY OF INVENTION

It has been discovered that the performance of centrifugal concentrators in capturing fine target materials can be improved by providing a bowl design in which the diameter of the lip zone can be varied over time. In this way the geometry of the retention zone can be varied to reduce the initial accumulation of barren materials and later increase the volume available for additional accumulation of target materials. In this way a greater quantity of higher grade material can be obtained from the operating cycle.

The invention provides a concentrator for separating particulate material of higher specific gravity from particulate material of lower specific gravity comprising: (a) a hollow drum having an open end and interior surface; (b) means for rotatably supporting the drum on an axis; (c) drive means for rotating the drum about the axis; and (d) material supply means to deliver the particulate material into the end of the drum spaced from the open end; wherein the interior surface of the drum comprises a migration zone, a retention zone above the migration zone and an inwardly inclined lip zone above the retention zone, and where the respective lengths of the migration, retention and lip zones and the relative degrees of inclination of the migration and lip zones are selected to provide a sufficient component of force on the particulate material to expel the lighter particulate material from the drum and to permit the heavier particulate material to be retained in the retention zone, and wherein the lip zone has a variable diameter provided by a flexible cylindrical member having an inner diameter which is selectively and uniformly decreased or increased by variation of the pressure applied to the member. Preferably the rate of decrease of the diameter is controlled through control of a supply of pressurized fluid such as compressed air.

The invention further provides a method of operating a centrifugal concentrator to maximize the recovery of target particles by varying the diameter of the lip zone over time and in particular by controlling the rate of decrease of the diameter of the lip zone over the centrifuging cycle.

BRIEF DESCRIPTION OF DRAWINGS

In drawings which illustrate a preferred embodiment of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
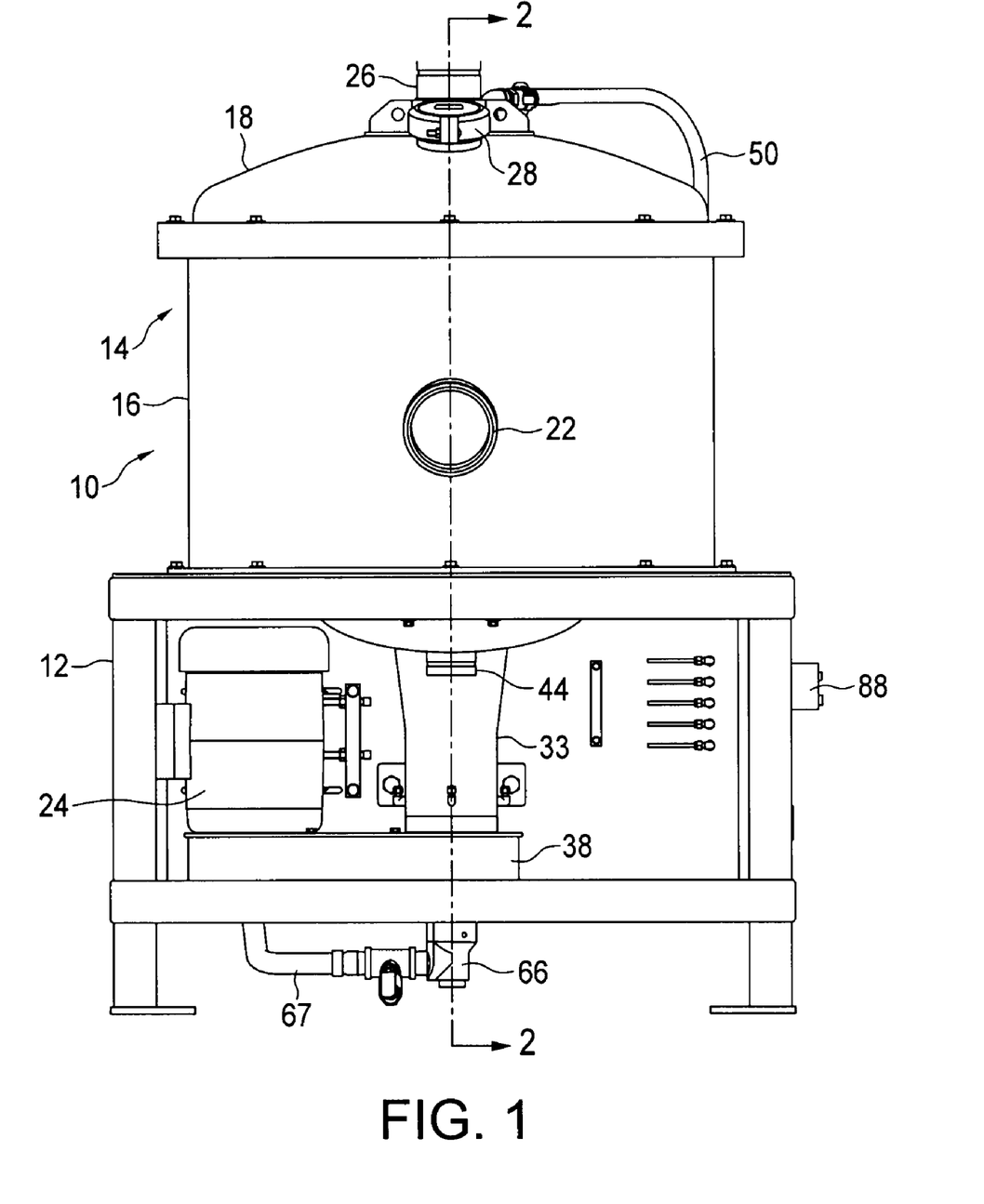
FIG. 1 is a side elevation view of the centrifuge of the invention.
Figure 2:
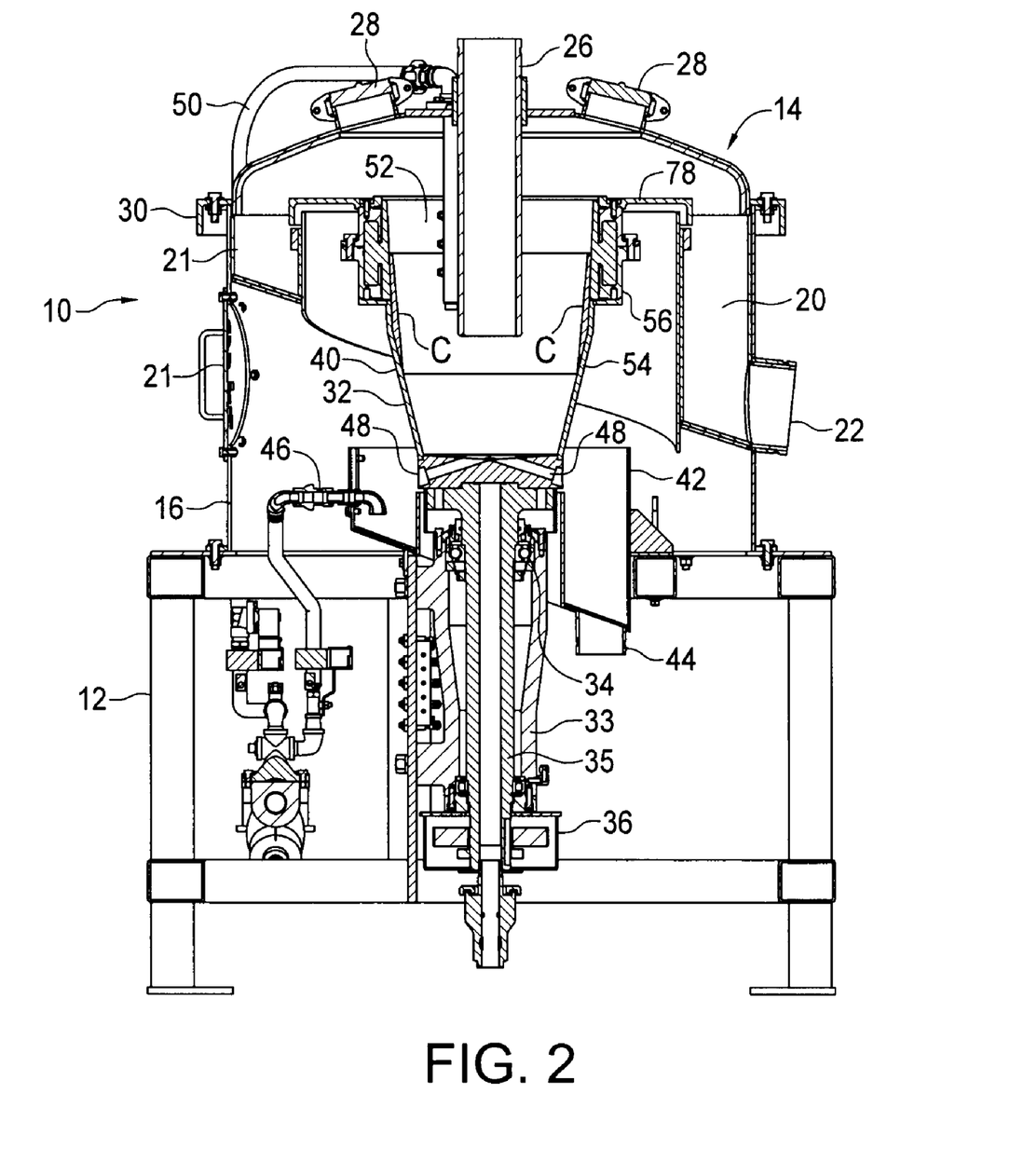
FIG. 2 is a vertical cross-section of the invention taken along lines 2-2 in FIG. 1.

With reference to FIGS. 1 and 2, the centrifuge of the invention is designated by reference numeral 10. It has a support frame 12, a shroud 14 consisting of a cylindrical wall 16, a shroud lid 18, tailings launder 20, access door 21 and tailings discharge port 22. Mounted in frame 12 is drive motor 24. The shroud lid 18 has openings for a slurry feed pipe 26 and inspection ports 28. An outer lower flange 30 of shroud lid 18 is bolted to a flange on cylindrical wall 16.

Rotor 32 is mounted in the frame 12 by bearing assemblies 34 in cartridge 33. The rotor has a sheave 36 which is driven by a belt (not shown) driven by drive motor 24 and protected by belt guard 38. Rotor 32 has a rotor bowl 40 of the same general type disclosed in this inventor's U.S. Pat. No. 4,824,431 in that, rather than relying on obstructions to the slurry flow in the surface of the rotor bowl 40, the inner surface of rotor bowl 40 forms three zones: a migration zone, a retention zone and a lip zone, which cause the denser, target particles from the slurry flow to be concentrated in the retention zone in the manner described in U.S. Pat. No. 4,824,431, which is incorporated herein by reference. A rotor baffle 38 (FIG. 3) is provided on the center of the floor of rotor bowl 40 which has three or four upstanding vanes to assist in the rotation of the slurry. Also mounted in frame 12 around the rotor 32 is concentrate launder 42 with a concentrate discharge port 44. Water is introduced into concentrate launder 42 through pipe 46. Discharge ports 48 in rotor bowl 40 carry concentrate into concentrate launder 42, with assistance of water introduced through pipe 50 and spray nozzles 52.

Figure 3:
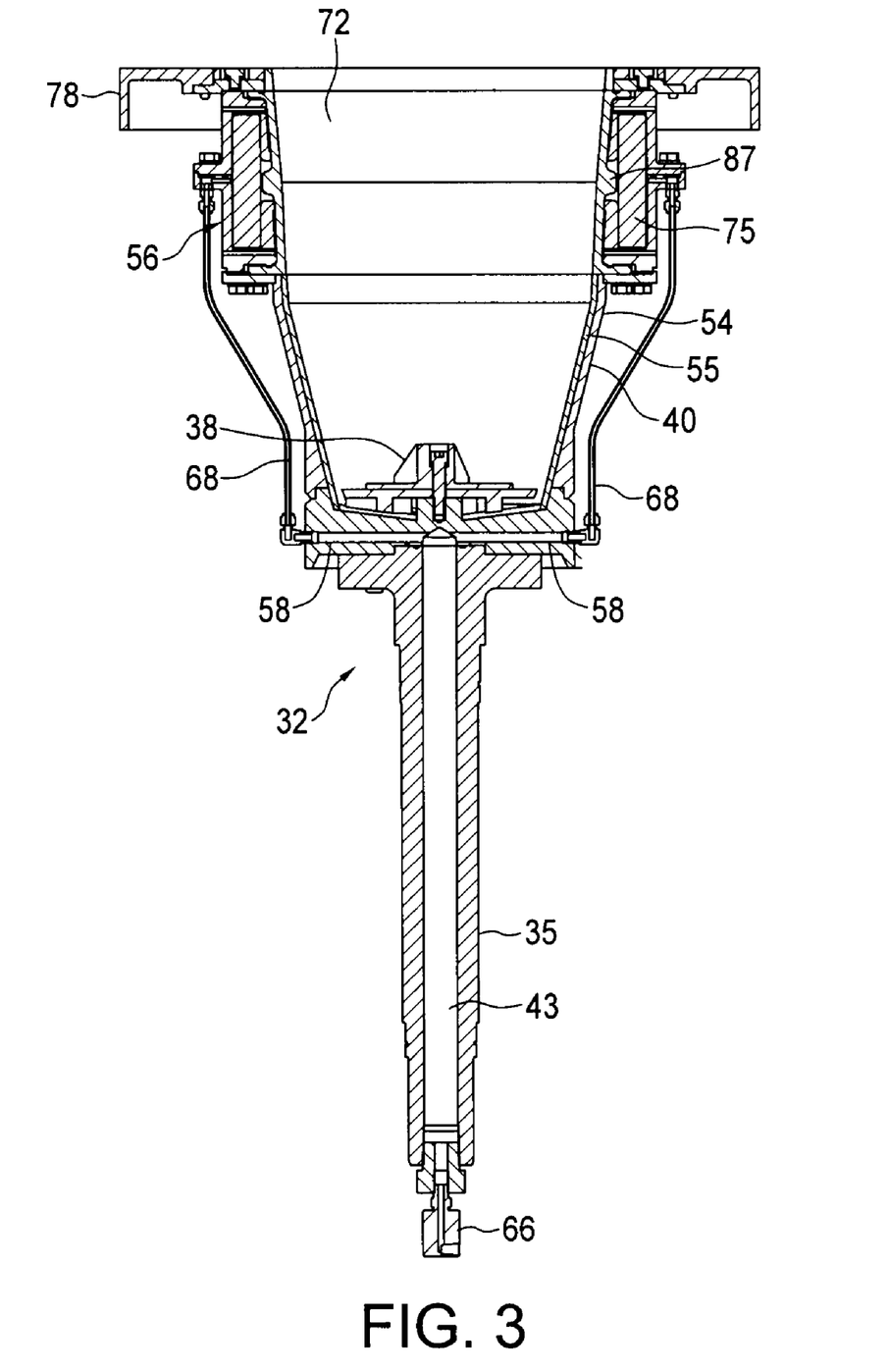
FIG. 3 is a vertical cross-section of the rotor of the invention.
Figure 4:
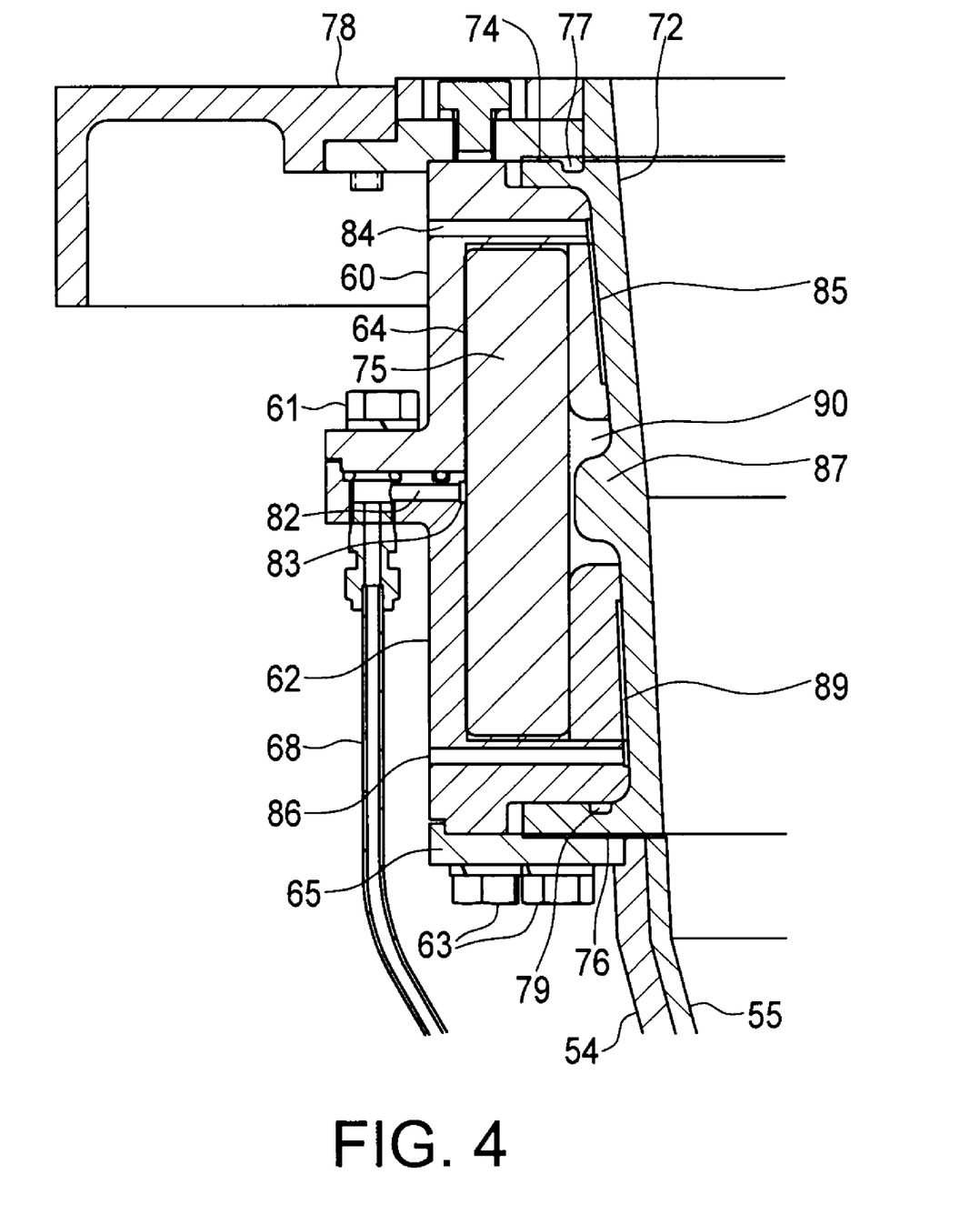
FIG. 4 is a detail cross-sectional view of the variable lip assembly as shown in FIG. 3.
Figure 5:
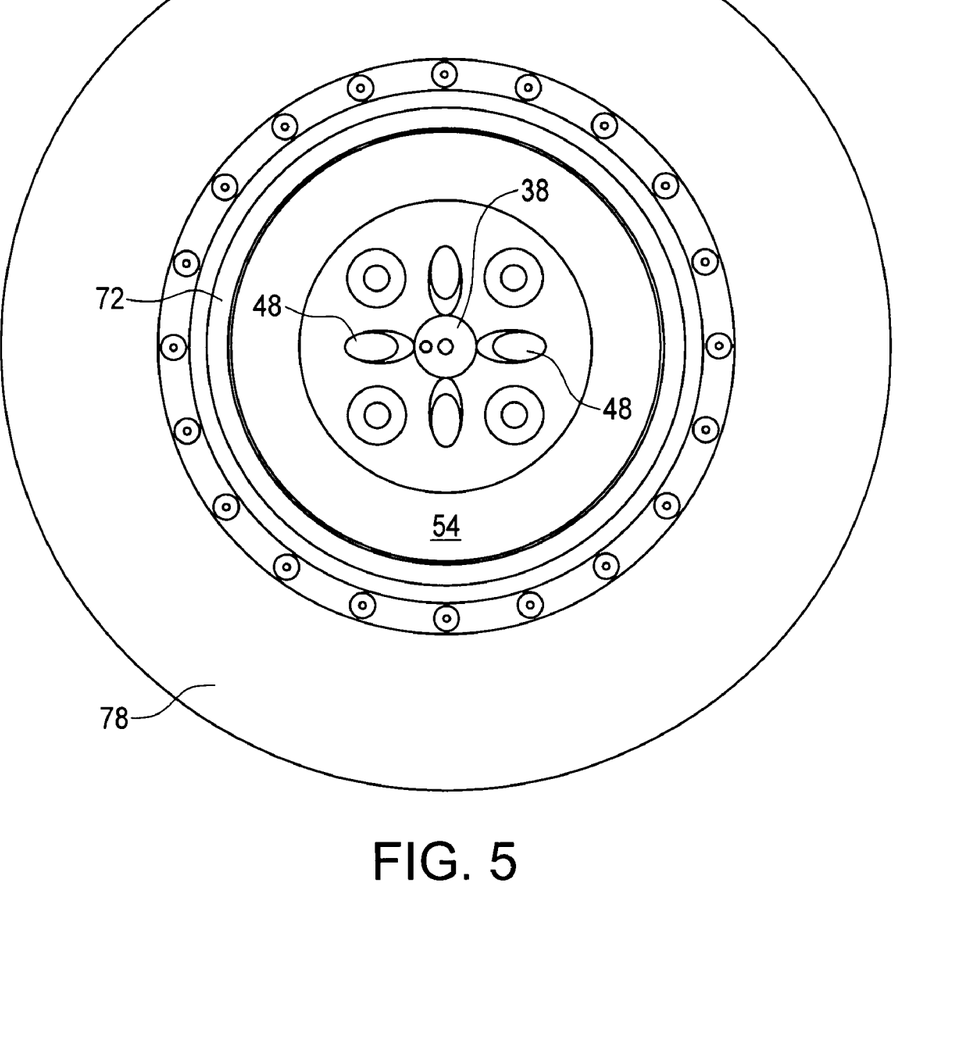
FIG. 5 is a top view of the rotor bowl.

Rotor bowl 40 is formed of a steel lower bowl section 54 lined with rubber 55 and variable diameter lip assembly 56 shown in more detail in FIG. 4. Lip assembly 56 comprises steel upper and lower air manifolds 60 and 62 bolted together by bolt 61 and which form cavity 64 and air gap 90. Lower air manifold 62 is in turn bolted to lower bowl section 54 by bolts 63 through flange 65. Lip ring 78 is bolted to upper air manifold 60. Contained within cavity 64 is cylindrical muscle member 75 made preferably of 60 Durometer rubber, preferably about 1.25 inches thick. Cylindrical protective sheath 72, also preferably formed of 60 Durometer rubber extends around the upper interior surface of bowl 40 and has flange 74 secured in place between lip ring 78 and upper air manifold 60 and has flange 76 secured in place between flange 65 and lower air manifold 62. Bosses 77 and 79 on ring 78 and lower air manifold 62 assist in securing the flanges 74, 76. Cylindrical protective sheath 72 has an outer cylindrical rib 87 which extends into gap 90.

Compressed air is supplied to the lip assembly in essentially the same way as compressed air is provided to the flow control valves in the present inventor's U.S. Pat. No. 5,462,513 which is incorporated herein by reference. A compressed air storage tank (not shown) provides compressed air through a stationary supply line 67 to rotating union 66. Rotating union 66 provides the compressed air from stationary supply line 67 to the hollow center 43 of rotor shaft 35 which in turn communicates with rotating supply lines 68 via channels 58 without loss of pressure. Rotating supply lines 68 provide compressed air to channels 82 which communicate with circumferential channel 83. Compressed air relief channels 84, 86 communicate with the outside atmosphere to release air pressure built up in chambers 85, 89.

An electrical control 88, preferably a programmable logic controller, is provided which controls the supply of compressed air to the lip assembly. It thereby controls the rate at which the diameter of the lip is reduced.

In operation, initially no air pressure is applied to channel 83 and the lip assembly is configured as shown in FIG. 4. Motor 24 is activated to rotate the rotor 32. The slurry feed is introduced to the spinning rotor 32 through feed pipe 26. Centrifugal forces cause the slurry to climb up the inner surface of the rotor bowl 40 before being expelled into tailings launder 20 and thence out of the machine through discharge port 22. Concentrate collects along the wall surface of the retention zone as indicated at "C" in FIG. 2. As the process advances, a layer of heavier concentrate builds up on the surface of the bowl 40. After an appropriate delay, which may be very short, when the retention zone has been filled with target concentrate, electrical control 88 causes an appropriate level of air pressure to be introduced to channel 83. This causes muscle member 75 to extend into gap 90 and press against outer rib 87 of protective sheath 72, causing the inner surface of protective sheath 72 to extend inwardly in a uniform way circumferentially, thereby reducing the upper diameter of bowl 40 and forming a dam or weir. The reduced lip diameter causes an increased capacity in the retention zone and allows further layers of target concentrate to build up. By further increasing the compressed air supply to channel 83, the build up of target concentrate in the retention zone can be maximized. The reduction in diameter of the lip can proceed in a step-by-step progression with discrete reductions, or continuously. Once the maximum amount of retained concentrate is reached, generally after a few minutes, the rotation of bowl 40 is significantly reduced, and water is sprayed through nozzles 52 to wash the concentrate into launder 42 and out discharge pipe 44. The maximum amount of variability of the diameter at protective sheath 72 will vary depending on the size of the bowl. Typically for a bowl 40 which has a diameter at its mouth of 1 meter it will be approximately 20 to 30 mm. but could be significantly larger or smaller for particular applications.

Compressed air may leak around muscle member 75 into gap 90 and into the spaces 85, 87 between protective sheath 72 and upper and lower air manifolds 60 and 62, thereby causing undesirable discontinuity in the surface of sheath 72. To relieve this pressure, pressure relief channels 84, 86 are provided and vented to the atmosphere. While compressed air has been disclosed, other compressible or non-compressible gases or fluids such as hydraulic fluid may be used as the source of pressure.

The programmed rate and degree of reduction of the lip diameter will vary depending on the nature of the slurry and the size of rotor bowl 40. In some cases it may be uniform. In other cases it may increase rapidly at first followed by a decrease in the rate of reduction. Or it may decrease slowly at first and then more rapidly.

While rubber has been disclosed as the preferred material for sheath 72, other flexible materials, synthetic or natural, such as polyurethane will be suitable provided they are sufficiently durable to withstand the harsh environment, and converge uniformly under the application of pressure.

Figure 6:
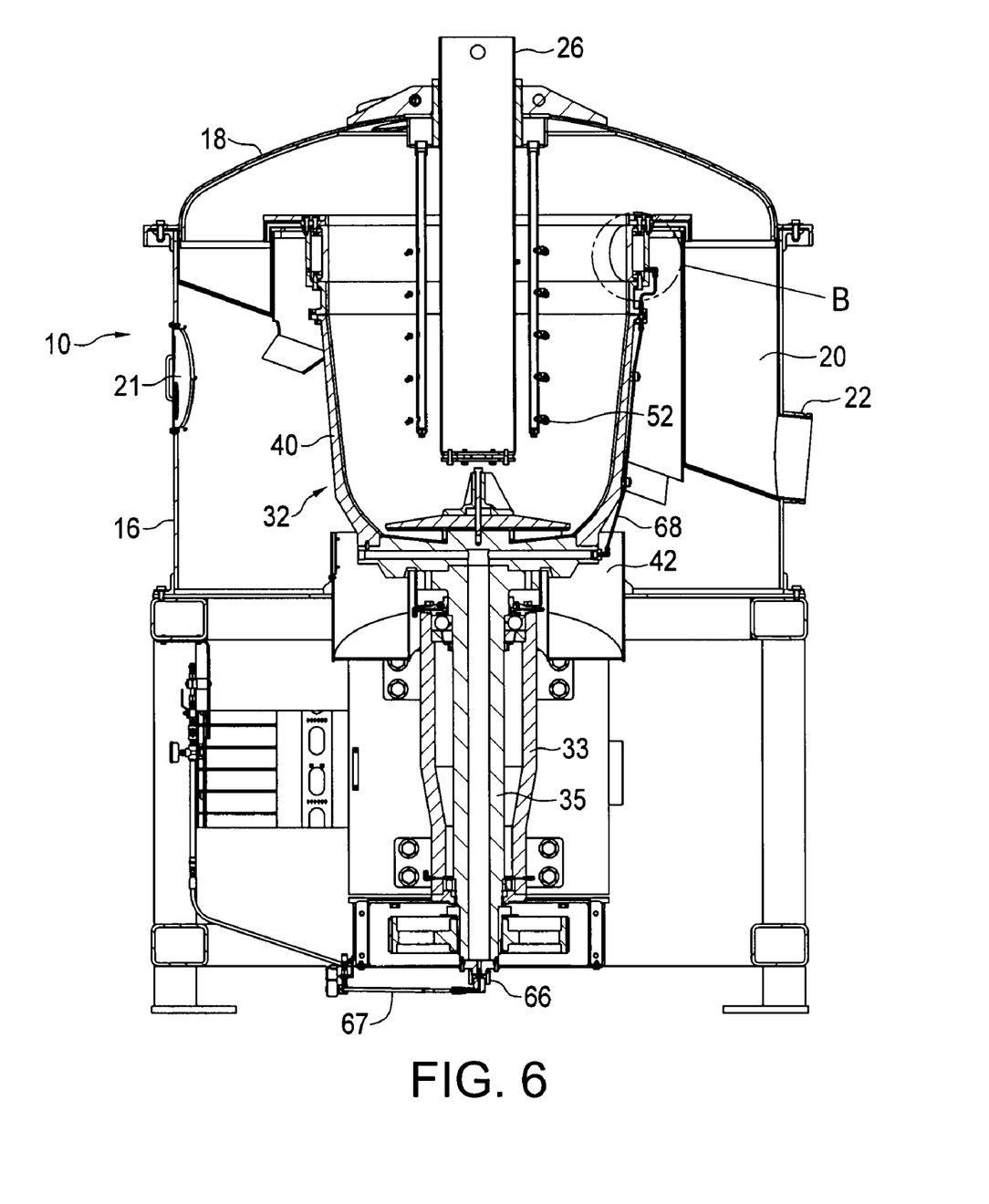
FIG. 6 is a vertical cross-section of a second embodiment of the invention taken along lines 2-2 in FIG. 1.
Figure 7:
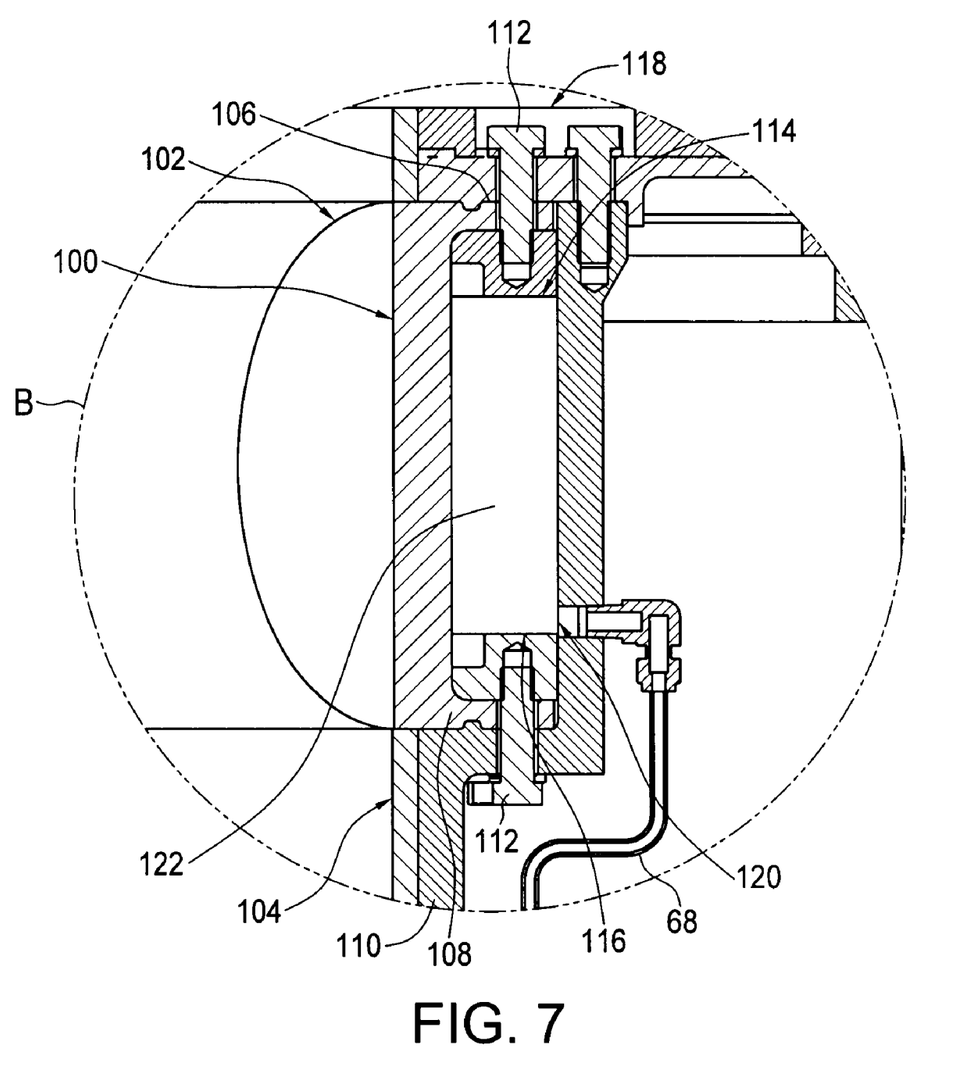
FIG. 7 is a detail of the cross-sectional view of the variable lip assembly area B as shown in FIG. 6.

A second embodiment of the invention is illustrated in FIGS. 6 and 7. In this case the muscle member 87 is dispensed with in order to provide a greater radial displacement of the flexible variable lip 100, illustrated in dotted outline at maximum radial extension at 102 from the rotor wall 104. Again the variable lip has flanges 106, 108 which are secured to the rotor 110 by bolts 112 into upper clamp ring 114 and lower clamp ring 116. Annular clamp plate 118 covers the heads of bolts 112. In this embodiment compressed air is delivered through supply line 68 through delivery aperture 120 directly into cavity 122 behind the flexible variable lip 100. Otherwise the mode of operation is as indicated above.

As will be apparent to those skilled in the art, various modifications and adaptations of the structure above described may be made without departing from the spirit of the invention. While the preferred embodiment has been described in the context of the separation of higher density particles from a slurry, it will be apparent to those skilled in the art that the invention has similar application in the separation of any two flowable substances of differing density, whether solid particles from solid particles, liquid from liquid or solid particles from liquid.

What is claimed is:

1. A centrifugal concentrator for separating particulate material of higher specific gravity from particulate material of lower specific gravity comprising:
   a) a hollow drum having an open end and interior surface;
   b) means for rotatably supporting the drum on an axis;
   c) drive means for rotating the drum about the axis; and
   d) material supply means to deliver the particulate material into the end of the drum spaced from the open end;
wherein the interior surface of the drum comprises a migration zone, a retention zone above the migration zone for retaining said particulate material of higher specific gravity and a lip zone above the retention zone, and where the respective lengths of said migration, retention and lip zones and the relative degrees of inclination of the migration and lip zones are selected to provide a sufficient component of force on the particulate material to expel the lighter particulate material from the drum and to permit the heavier particulate material to be retained in the retention zone, and wherein the lip zone has a variable diameter provided by a flexible cylindrical member having an inner diameter which is selectively and uniformly decreased or increased by variation of the pressure applied to the member, wherein pressure is variably applied to the outer surface of said flexible cylindrical member by a flexible annular member whereby by decreasing the inner diameter of the lip zone the volume of material able to be retained in said retention zone is increased.

2. The concentrator of claim 1 wherein the rate of decrease of the diameter is controlled through control of a supply of pressurized fluid.

3. The concentrator of claim 2 wherein said pressurized fluid is compressed air.

4. A method of operating a centrifugal concentrator to maximize the recovery of target particles, wherein said centrifugal concentrator comprises a) a hollow drum having an open end and interior surface; b) means for rotatably supporting the drum on an axis; c) drive means for rotating the drum about the axis; and d) material supply means to deliver the particulate material into the end of the drum spaced from the open end; and wherein the interior surface of the drum comprises a migration zone, a retention zone above the migration zone for retaining said particulate material of higher specific gravity and a lip zone above the retention zone, and where the respective lengths of said migration, retention and lip zones and the relative degrees of inclination of the migration and lip zones are selected to provide a sufficient component of force on the particulate material to expel the lighter particulate material from the drum and to permit the heavier particulate material to be retained in the retention zone, and wherein the lip zone has a variable inner diameter whereby by decreasing the inner diameter of the lip zone the volume of material able to be retained in said retention zone is increased, said method comprising varying the diameter of the lip zone over time and controlling the rate of decrease of the diameter of the lip zone over the centrifuging cycle.

5. The method of claim 4 wherein said decrease in diameter of the lip zone is carried out in a series of discrete reductions.

6. The method of claim 4 wherein said decrease in diameter of the lip zone is carried out continuously.

7. The method of claim 4 wherein the rate of decrease in diameter of the lip zone is carried out uniformly.

8. The method of claim 4 wherein the rate of decrease in diameter of the lip zone is varied over the course of the concentration cycle.

9. The method of claim 4 wherein the rate of decrease in diameter of the lip zone is more rapid earlier in the concentrating cycle than later.

10. The method of claim 4 wherein the rate of decrease in diameter of the lip zone is more rapid later in the concentrating cycle than earlier.

11. A centrifugal concentrator for separating particulate material of higher specific gravity from particulate material of lower specific gravity comprising:
   a) a hollow drum having an open end and interior surface;
   b) means for rotatably supporting the drum on an axis;
   c) drive means for rotating the drum about the axis; and
   d) material supply means to deliver the particulate material into the end of the drum spaced from the open end;
wherein the interior surface of the drum comprises a migration zone, a retention zone above the migration zone for retaining said particulate material of higher specific gravity and a lip zone above the retention zone, and where the respective lengths of said migration, retention and lip zones and the relative degrees of inclination of the migration and lip zones are selected to provide a sufficient component of force on the particulate material to expel the lighter particulate material from the drum and to permit the heavier particulate material to be retained in the retention zone, and wherein the lip zone has a variable diameter provided by a flexible cylindrical member having an inner diameter which is selectively and uniformly decreased or increased by variation of the pressure applied to the member whereby by decreasing the inner diameter of the lip zone the volume of material able to be retained in said retention zone is increased.

12. The concentrator of claim 11 wherein the rate of decrease of the diameter is controlled through control of a supply of pressurized fluid.

13. The concentrator of claim 12 wherein said pressurized fluid is compressed air.

14. The concentrator of claim 11 wherein pressure is variably applied to the outer surface of said flexible cylindrical member.

15. The concentrator of claim 14 wherein pressure is variably applied to the outer surface of said flexible cylindrical member by a flexible annular member.

16. The concentrator of claim 14 wherein pressure is variably applied directly to the outer surface of said flexible cylindrical member by said pressurized fluid.

* * * * *